July 11, 1961
E. LEUBAZ
2,991,698
SAFETY MARKER
Filed Dec. 13, 1957
5 Sheets-Sheet 1
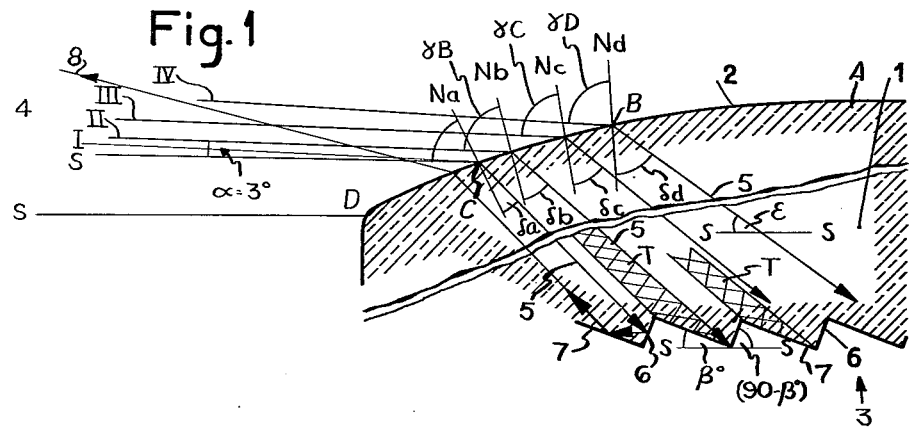
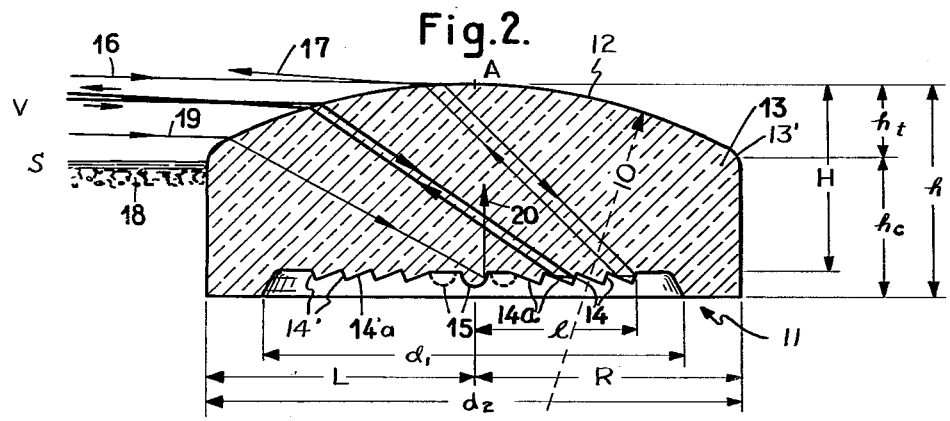
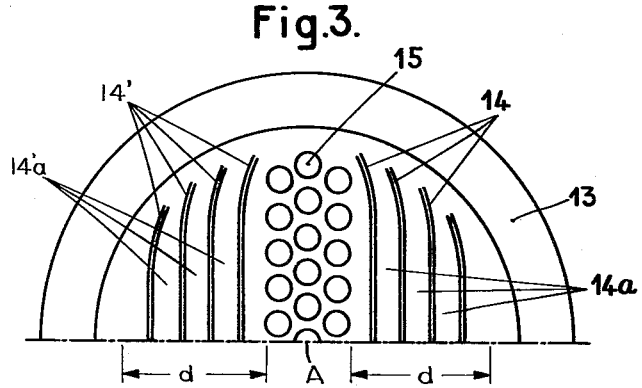
INVENTOR
ERNEST LEUBAZ
By Toulmin & Toulmin
Attorneys July 11, 1961  E. LEUBAZ  2,991,698
SAFETY MARKER
Filed Dec. 13, 1957  5 Sheets-Sheet 2
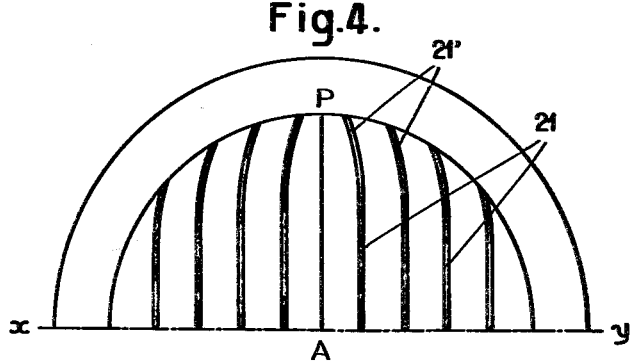
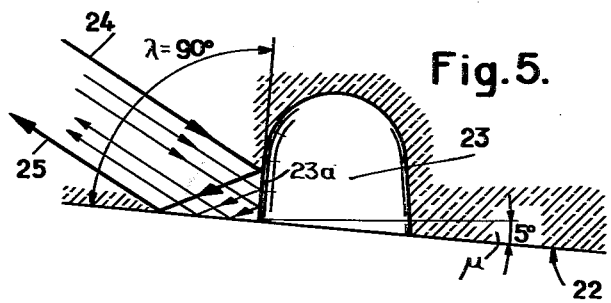
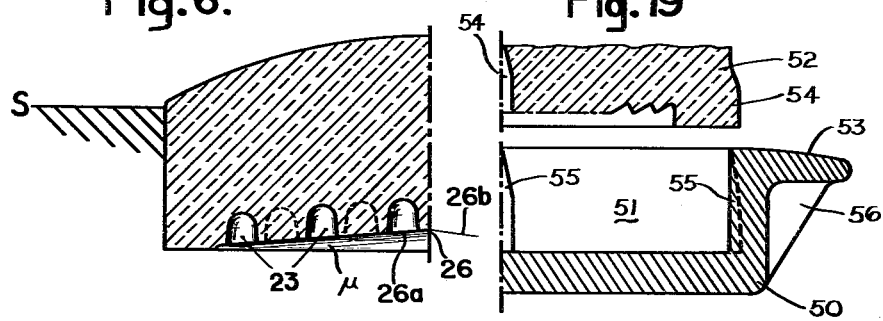
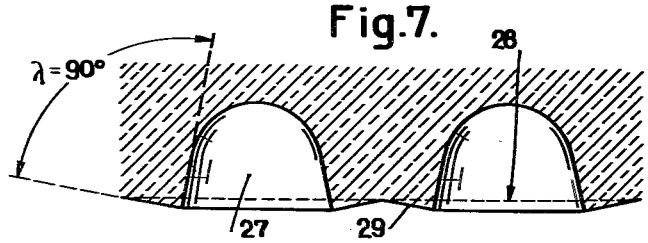
INVENTOR
ERNEST LEUBAZ
By Toulmin & Toulmin
Attorneys

Fig. 8.
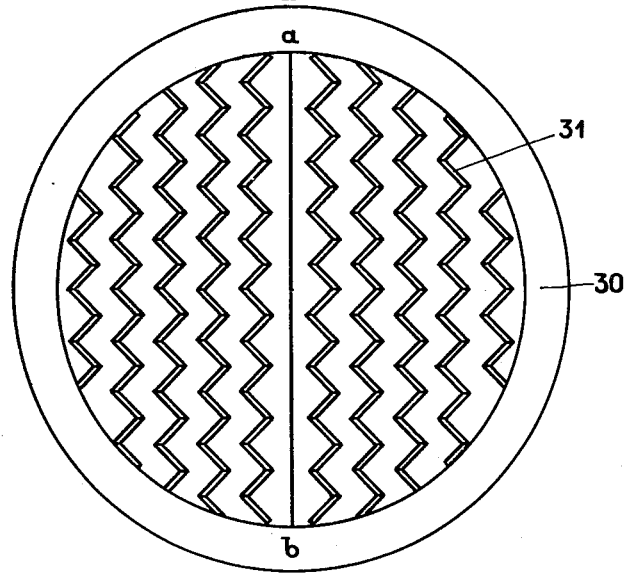
Fig. 9.
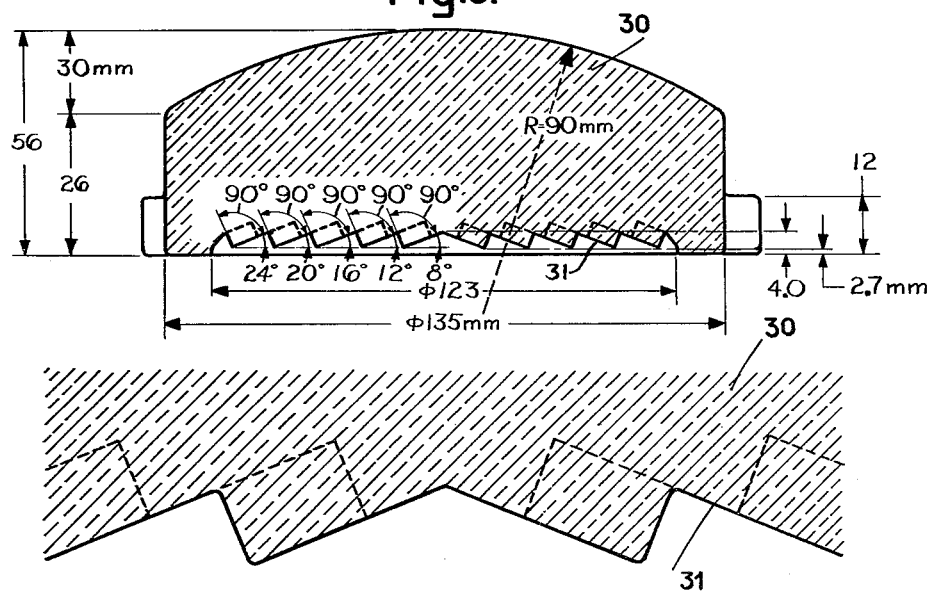
Fig. 10

July 11, 1961   E. LEUBAZ   2,991,698
SAFETY MARKER
Filed Dec. 13, 1957   5 Sheets-Sheet 5

INVENTOR
ERNEST LEUBAZ

By *Taulmin & Taulmin*
Attorneys

United States Patent Office 2,991,698
Patented July 11, 1961

2,991,698
SAFETY MARKER
Ernest Leubaz, Petite Fusterie 2, Geneva, Switzerland
Filed Dec. 13, 1957, Ser. No. 702,573
Claims priority, application Switzerland Aug. 22, 1955
10 Claims. (Cl. 88—79)

This invention relates to safety markers, and more particularly to a novel highway or road marker adapted for returning light from a source such as an automobile headlight, back to the vicinity of the source so that, for instance, the driver of the automobile may become aware of the marker already at a great distance therefrom.

This is a continuation-in-part of my patent application Serial No. 605,300, filed August 21, 1956, now abandoned.

It is an object of my invention to provide a safety road marker of the above nature which will be adapted to reflect light received at a very small angle with the road surface from, for instance, the headlight of an automobile which is still at great distance, in such a manner that the major portion of the incident light is reflected at a slighty larger angle, relative to the road surface, toward the automobile so as to be detected by the driver of the latter from that great distance.

It is another object of my invention to provide a safety road marker of the characteristics described which is compact and withstands even heaviest loads passing thereover, without being damaged.

It is still another object of my invention to provide a safety road marker which can be easily embedded in the surface of a road or highway and the reflector body of which can be easily removed from a novel type of mounting.

The known road signals or markers destined for the same purposes of delineating a determined track or lane of the road, all suffer from the drawbacks of being either too light and easily breakable, or of reflecting too low a proportion of the incident light, in particular while the angle of the incident light is still very small, i.e. while the approaching vehicle is still at a great distance, so that those markers are often noticed too late in order to prevent road accidents.

These road markers must be embedded in the road surface to protrude from the latter only in a negligible amount so as not to represent a source of danger to a vehicle passing thereover with one of its wheels by, for instance, causing damage to the tires, or the like undesirable effects. However, this requirement causes special problems of light reflection, which the known art has tried to solve by causing a light scattering effect. This type of effect which is utilized, for instnace, in the patent to Langdon, 2,229,179, and all other known effects are accompanied by losses of intensity of the reflected light which greatly reduce the effectivity of the signal body as a road marker.

These drawbacks are overcome and the above-mentioned objects are attained by the safety marker according to my invention which comprises a body of solid light-transmissive material having a convex top surface which protrudes only slightly from the road surface, and at its bottom surface at least one zone of saw-tooth shaped cross section, the indenture between every two saw-teeth in the plane of the cross section being formed by an inclined L-shape, corresponding to a right-angled dihedron mirror from which incident light is reflected parallel to its direction of incidence.

In this mirror zone at the bottom surface of the marker body, the mirror planes the projection of which is constituted by the short arm of the L cross section, extend at a substantially oblique angle to the direction of the incident light rays and intercept the major portion thereof to reflect the same toward the mirror planes corresponding to the long arm of the L cross section, from where they are returned to the convex top surface of the marker body and then refracted from there toward the outside at an angle with the road surface greater than the angle under which the light from a vehicle arrives at the convex marker surface.

According to another feature of the invention, the light received from one side of the road marker at the convex top surface thereof, is refracted through the marker body toward a zone of the mirrored bottom surface diagonally opposite the side of light incidence, while the light received from a vehicle travelling in an opposite direction, which light is received on the opposite marker side, is refracted toward a mirrored zone at the bottom surface of the marker on the first mentioned side of the marker.

In the reflecting zones the mirror planes or faces corresponding to the long arm of the above-mentioned L must be inclined forward in the direction of the incident refracted light travelling through the marker body, while the faces corresponding to the short arms of the said L must be disposed to oppose the path of travel of that same light so as to reflect the latter.

Thereby, by far the greater portion of the light coming from the convex top surface is reflected toward the same by the long L arm faces.

The proportion of light received by the latter long L arm faces, and which is reflected by the short L arm faces back to the convex top surface is maintained low so as not to exceed 5 to 10% and thus remains of no significance, due to the fact that the long L arm faces are inclined forwardly upwardly toward the incoming light so as to be almost parallel with the same, i.e., the long L arm faces form an angle β with the surface of the ground, or, which is the same thing, with the plane tangential to the marker body, at the apex of the latter, which angle is only slightly smaller than the angle formed between the refracted rays of light, incident as well as reflected, and the ground surface.

This invention will be better understood from the further description thereof in the connection with the accompanying drawings, in which:

FIGURE 1 is a cross sectional fragmentary view of a road marker according to the invention, with the aid of which the optical functions of the road marker shall be explained;

FIGURE 2 is a cross sectional view of a horizontally circular marker lens body according to the invention and being a first embodiment thereof;

FIGURE 3 is a top half view of the marker lens body shown in FIGURE 2;

FIGURE 4 is a similar top half view of a marker lens body according to the invention, but with a slightly varied bottom mirror arrangement;

FIGURE 5 shows a third embodiment of the mirror zones of a lens body according to the invention, in cross sectional view;

FIGURE 6 shows a fragmentary view of the embodiment illustrated in FIGURE 5 and serves for explaining the optical functioning of this embodiment;

FIGURE 7 shows a slightly varied detail in a view similar to that of FIGURE 6;

FIGURE 8 shows a top view of yet another embodiment of the mirror arrangement in the road marker according to the invention;

FIGURE 9 is a cross sectional view of the same road marker as shown in FIGURE 8;

FIGURE 10 shows a number of mirror elements of the marker in FIGURES 8 and 9, on an enlarged scale;

Figure 12:
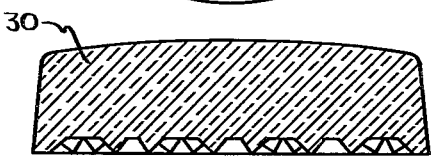
Figure 13:
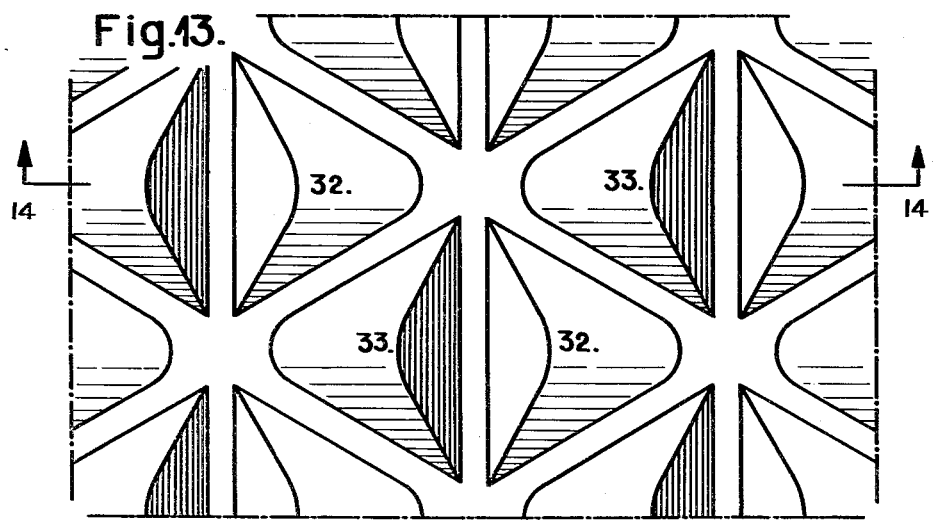

FIGURE 12 a cross sectional view of a further embodiment according to the invention;

FIGURE 13 being a fragmentary top view, and

Figure 11:
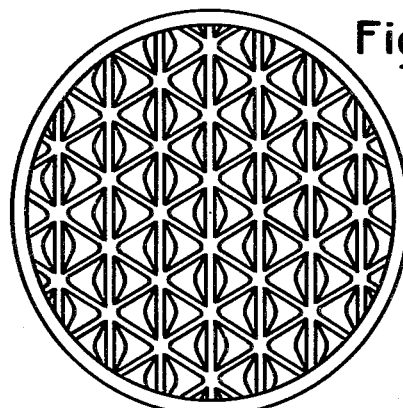
FIGURE 11 shows a top view.
Figure 14:
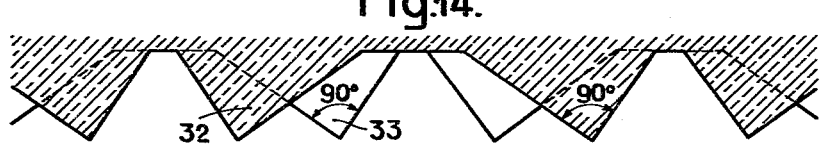
Figure 15:
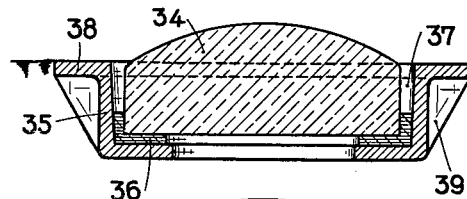

FIGURE 14 being a fragmentary cross sectional view of the same embodiment of FIGURES 11 and 12;

FIGURE 15 illustrates in cross sectional view, and

Figure 16:
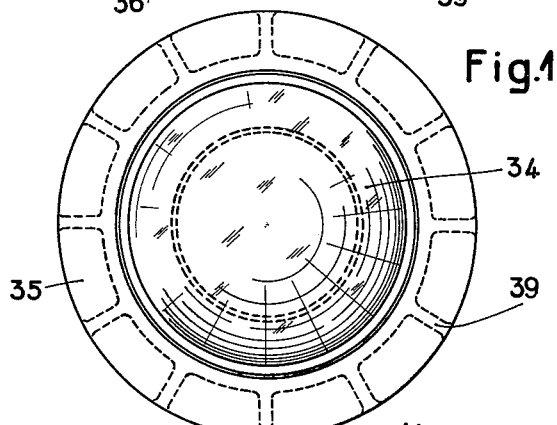
Figure 17:
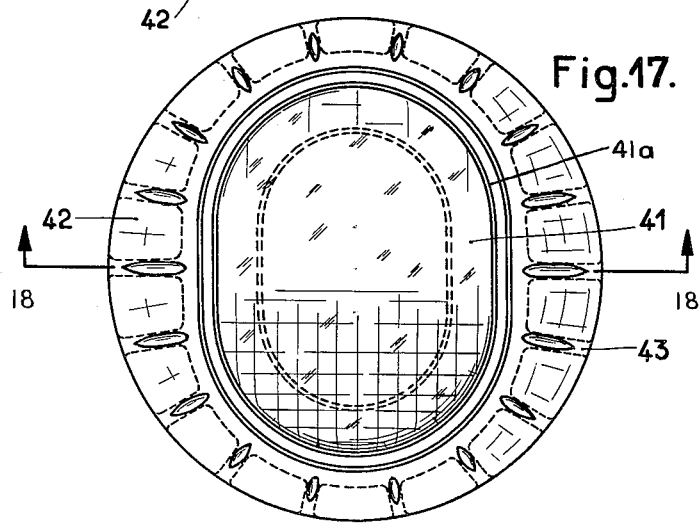

FIGURE 16 in top view a horizontally circular road marker assembly comprising a marker lens body which can be used in conjunction with the device in any one of the preceding figures;

FIGURE 17 illustrates in top view, and

Figure 18:
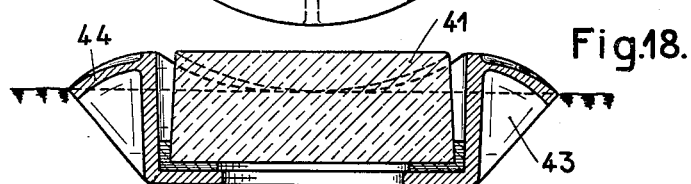

FIGURE 18 in cross sectional view along line 18—18 in FIGURE 17, yet another embodiment of a marker lens body and road marker assembly therefor, in which the lens body is of elliptic shape taken in a horizontal plane; and FIGURE 19 illustrates in cross section a novel plastic mounting for a marker lens body according to my invention.

Referring now to the drawings more in detail, and more particularly to FIGURE 1, the path of a single light ray is illustrated in this figure, which shows the marker lens body 1 having its upper part formed as a calotte with a convex top surface 2, while the bottom 3 is provided with a mirrored zone which comprises narrow-width planes 6 alternating with broad-width planes 7 and being disposed at a right angle relative to each other.

Furthermore these two types of planes are in saw-tooth or L-shaped arrangement relative to each other, if taken in a cross sectional plane, and at an inclination toward the bottom plane and the convex top surface of the marker lens body 1, which can best be determined by the angle $\beta$ formed by planes 7 with the road surface plane S.

The angle at which planes 6 are inclined toward the surface plane S is then, of course, $(90-\beta)°$.

This angle $\beta$ is so chosen that incident light arriving from the headlights of a vehicle at a distance between about 200 meters and 10 meters is refracted along the top surface between points D and A, i.e. between where the calotte portion of body 1 emerges from the ground and the apex of the calotte, substantially or with its major portion toward the mirror faces 6, while only a mirror portion impinges upon mirror faces 7.

Angle $\beta$ is therefore, preferably, slightly less than the flattest angle $\epsilon$ formed by the refracted part 5 of an incident ray 4 with the plane S, after refraction at a point somewhat above D on the top surface 2 of lens body 1, for instance in the region of peripheral points B and C.

Thereby, the major portion of refracted rays 5 impinges on mirror faces 6 being inclined so as to extend at a substantially oblique angle to the path of rays 5. The latter are thereby reflected toward adjacent faces 7 and from there back to top surface 2 in the form of return rays 8, which emerge from the top surface 2 at points which are somewhat nearer the light source than where the corresponding incident rays arrived thereon.

Thus, selecting the incident-ray $4_I$ from the headlight of an automobile at about 14 meters, this light ray forms an angle $\alpha$ of about 3° with the road surface S, while it impinges on the top surface 2 of the calotte portion of lens body 1 at a point C, when it forms an angle of incidence $\gamma_c$ which the normal $N_c$ on the surface 2 through this point C, which angle $\gamma_c=71°$.

The refractive index of the lens glass being assumed to be 1.5, it will easily be understood that the refracted ray 5 forms an angle $\delta_c=39°$ with the normal $N_c$, which is then reflected from surfaces 6 and 7 as return ray 8 emerging from the lens body 1 at point B, i.e. nearer the approaching vehicle, where the curvature of surface 2 is somewhat greater. Consequently the angle $\delta_b$ formed by ray 8 with the normal $N_b$ at point B is only $\delta_b=37°$ or somewhat smaller than angle $\delta_c$. According to the known laws of reflection rays 5 and 8 are parallel to each other, as being reflected by two mirrors at 90° to each other.

Reflected ray 8 then leaves the lens body 1 at an angle $\gamma_b=66°$ with Normal $N_b$. The normal $N_c$ forms an angle of about 16° and the normal $N_b$ in FIGURE 1 an angle of about 18° with the perpendicular or central axis of body 1 passing through the apex A of the calotte. This difference must be subtracted from the difference of 5° between angles $\gamma_c$ and $\gamma_b$. Ray 9 will thus be returned to the vehicle at an angle to the road surface which is slightly greater, i.e. by about 3°, than the aforesaid angle $\alpha$, so that this reflected light is directed against the driver of the vehicle.

The angle $\alpha$ of incident light thus reflected covers the range of from about 0.2° where the vehicle is at a distance of about 200 meters, to about 7° where the vehicle would be at a distance of about 6 meters. At a distance of about 14 meters, the downwardly directed portion of the light from the headlights of an automobile, for instance the "city lights" will normally form an angle of about 3° with the road surface.

Only a mirror portion of light rays 5 from the region of points B and C is refracted in cross-hatched zones T, i.e. in such a manner that it meets first the faces 7 and is reflected toward faces 6. This light portion emerges from the lens body 1 at an angle with the road surface still smaller than the incident light. This light portion is thus lost by becoming invisible to the driver. However, its amount is negligible, it being practically confined to about 5 to 10% of the total impinging light.

The inclination of the faces 6 and 7, i.e. angle $\beta$ is preferably determined empirically and depends on the radius of the curvature of surface 2 and on the medium average angles under which the light from a vehicle is to be received and reflected. The latter angles are chosen between 0.2° and 7° as mentioned hereinbefore.

According to a first embodiment of the invention as illustrated in FIGURE 2, the lens body 13 is provided with a calotte-shaped or frusto-spherical top portion having the convex surface 12 and the radius 10 and having a circular circumference as shown in FIGURE 3 with the center A being the apex of the calotte.

The lens body 13 is destined for receiving light from sources either to the left or to the right therefrom in FIGURES 2 or 3, at angles between about 0.2° and about 7° with the surface S of the ground or highway 18 in which the lens body 1 is embedded.

Correspondingly, the bottom surface 11 of the lens body 1 comprises two light reflecting mirror zones L and R, one to the left, and the other to the right of the central vertical plane through the apex A and at right angle to the two directions from which light is expected to impinge on lens body 1. This central vertical perpendicular plane is designated by line A—P in FIGURE 3. Mirror zone R at bottom 11 is destined for receiving light received at the top surface 12 to the left of apex A, and zone L is destined for receiving light from the right of apex A.

Consequently, the indentures of zone R which have the same basic L-shaped cross section as described in FIGURE 1, are so arranged that the short L arm faces or primary reflector faces 14 are directed to oppose the light from the left half of convex surface 12, while the long L arm faces or secondary reflector faces 14a are inclined toward that left side so as to avoid as much as possible primary impingement of refracted incident light rays thereon.

On the other hand, short L arm faces or primary reflector faces 14' are destined for having the major portion of a light beam received from the right half of the convex surface 12 impinge thereon, while long L arm faces 14'a are inclined upwardly toward the right, thus forming secondary reflector faces receiving reflected light from the primary reflector faces 14' only, and reducing to a minimum the share of light directly received from the right of top surface 12.

In the central region of the bottom 11 in the vicinity of its intersection with the plane A—P, there are provided a plurality of cup-shaped protrusions 15 the function of which will be explained further below.

It will be easily understood that if the mirrors constituted by the saw-tooth shaped right angled (L-shaped) dihedrals extend rectilinearly parallel to plane A—P, a good reflection is only obtained in the case of pencils of light coming from vehicles travelling in a direction perpendicular to the plane A—P. They are, therefore, preferably given a slightly curved extension so as to enable them to reflect toward the driver the light of the head-lights of a vehicle even if that vehicle approaches the lens body 13 in a direction somewhat differing from the axis of the road transversely to which the mirror faces in bottom 11 are disposed.

For this reason and as shown by the half plane view of FIGURE 3, the ends of mirror faces 14, 14a and 14', 14'a are slightly curved inwardly toward plane A—P.

FIGURE 2 further shows how an incident ray 16, entering the lens body 13 in the neighborhood of the top convex surface 12 is refracted to just attain the last group of mirrors 14 opposed to the side from which the ray arrives and how this ray is reflected as ray 17 after having followed the path previously described, i.e. passing ultimately through a zone of the lens body 13 nearer the vehicle than the incoming light and to be then sent back toward the vehicle under an angle with the ground 18 which angle is slightly greater than that of the ray 16 with ground 18.

Below the rays 16, 17 there is shown in stronger lines another incident ray and its reflected correspondent ray, showing that the described phenomena occurs practically for any rays attaining the left side of the lens calotte.

Only at the extreme limit, for a ray such as 19, attaining said calotte in the neighborhood of its horizontal peripheral edge 13', a change in the optical functions takes place, in as much as said ray 19 attains the cup-shaped mirrors 15 from which it is reflected practically vertically upwardly in the direction indicated by arrow 20.

The object of this disposition is to attract the attention of pedestrians which are at a crossing equipped with such lens markers, in that these markers light up at the approach of a vehicle which is already signalized by its head lights. The upwardly projected rays 20 light up the entire crossing for everybody looking at it, and give the crossing a fluorescent aspect.

In this arrangement of mirror zones as shown in FIGURE 1, it will be noted that the height $h$ from the bottom 11 in which the mirror zones extend, as well as the diameter $d$ of these zones in the direction of main light incidence are interdependent factors and are both determined by radius 10 of surface 12. Thus, if $h$ were considerably smaller than in FIGURE 2 the major portion of incident light rays intermediate limit rays 16 and 19 would not reach the mirror zone R but would impinge on the bottom 11 short thereof, i.e. in the zone L instead of zone R. The result would be a scattering of the light mostly in upward direction, and the marker would not be visible at the desired long distance.

If, on the other hand, the height $h$ were much greater than in FIGURE 2, most of the incident light intermediate limit rays 16 and 19 would impinge not on mirror zone R but on the right hand portion of the vertically extending cylindrical wall of body 13 and would thus be lost.

Since the calculation of $h$ would require very complicated formulae, I prefer to determine the same geometrically by the limit rays as shown in FIGURE 2.

A number of numerical examples will be given to illustrate how this invention is carried out in practice, these examples being, however, not to be considered as limitative in any way.

Example I

Cm.
- $h_c$=height of cylindrical bottom portion of lens body _____ 26
- $h_t$=height of calotte portion _____ 30
- $h$=total height of marker (distance apex-bottom) __ 56
- $d_1$=diameter of combined mirror zones in main plane of incident light rays _____ 136
- $d_2$=diameter of cylindrical bottom portion _____ 150
- $\mu(10)$=radius of convex top surface (12) _____ 110
- $\beta$=angle of secondary reflector faces with bottom plane varying from 8° (innermost) to 22° (outermost).

Example II

Cm.
- $h_c$=height of cylindrical bottom portion of lens body _____ 21
- $h_t$=height of calotte portion _____ 42
- $h$=total height of marker (distance apex-bottom) __ 63
- $d_1$=diameter of combined mirror zones in main plane of incident light rays _____ 136
- $d_2$=diameter of cylindrical bottom portion _____ 150
- $\mu(10)$=radius of convex top surface (12) _____ 88
- $w$=width of secondary reflector faces _____ 10
- $\beta$=angle of secondary reflector faces with bottom plane varying from 5° (innermost) to 25° (outermost).

Example III

Cm.
- $h_c$=height of cylindrical bottom portion of lens body _____ 26
- $h_t$=height of calotte portion _____ 30
- $h$=total height of marker (distance apex-bottom) __ 56
- $d_1$=diameter of combined mirror zones in main plane of incident light rays _____ 123
- $d_2$=diameter of cylindrical bottom portion _____ 135
- $\mu(10)$=radius of convex top surface (12) _____ 90
- $w$=width of secondary reflector faces _____ 9
- $\beta$=angle of secondary reflector faces with bottom plane varying from 8° (innermost) to 24° (outermost).
- Width of primary reflector faces _____ 0.3

The variation of angles $\beta$ will best be seen in the embodiment shown in FIGURE 9, which will be described in detail hereinafter.

FIGURE 4 is a half plane view similar to that of FIGURE 3 but illustrating another embodiment. It differs from the former in that the lens body 13 has no cup-shaped mirrors of the type previously described, but is provided exclusively with mirrors constituted by right-angled dihedrons which are so as to give a saw-tooth shaped disposed cross section and extend in a straight line parallel to a given diameter 21 and inwardly curved portions 21' at their respective ends. These portions 21' serve for the purpose previously described, namely to send back to the driver of a vehicle the light of the head lights of the latter, even though the vehicle does not approach the lens body in the direction of the axis x—z, but somewhat deviating therefrom.

In yet another embodiment, according to FIGURES 5 and 6, the mirror faces in the bottom portion are not constituted by right angled dihedrons.

It is, in fact, essential that the glass lens bottom has primary and secondary reflecting elements, the active surfaces of which are disposed at angles of 90° to each other and permitting a ray attaining a primary reflector thereof to be reflected toward the secondary element and by the latter in a direction parallel to the first ray and at the same time displaced toward the direction of the light source.

FIGURE 5 shows how this result can be obtained by providing the bottom 22 of the lens with cup-shaped recesses 23 directed upwardly thereinto, whereupon the entire bottom can be silvered, so that it constitutes a plane reflecting surface and the cup-shaped reflecting recesses protruding like embossed parts into the inner of the lens approximatively taking the shapes of a plurality of thimbles. FIGURE 6 shows in fact in a cross-section how a certain quantity of such reflecting recesses can be disposed side by side and in staggered arrangement in the bottom 22 of the lens.

FIGURE 5 also shows that a condition which must be fulfilled, is all the same that each reflecting recess 23 (which is in reality a thimble-shaped hollow in the glass) must be provided in such a direction that its lateral wall 23a forms at least at one place a right angle γ with the bottom 22 of the lens. This is to ensure that an incident light ray such as ray 24 will be reflected twice and be returned as ray 25 in a direction parallel to its incoming direction and displaced nearer the direction of the luminous source, as it is the case also for the other rays shown in the same figure.

I have also found that it is advisable to incline the bottom 22 at an angle μ of 5° relative to the road surface S as shown in FIGURES 5 and 6. FIGURE 6 shows that the said inclination μ has to be provided for two planes 26a and 26b forming a dihedral of which the apex 26 would extend perpendicularly to the diameter A—P of the lens (see FIGURE 4). This has the purpose of making the lens responsive to light coming from the left as well as to light coming from the right with regard to the drawing, in the same manner as the embodiments according to FIGURES 2 to 4 which have analogous symmetrical arrangements.

A slightly different embodiment is shown in FIGURE 7. This embodiment also comprises reflecting elements in the form of thimble-shaped recesses 27 extending from the bottom of the lens body into the interior of the lens, but instead of these recesses 27 being disposed in a bottom which is inclined relative to the horizontal plane when in use, the bottom of the lens in the embodiment shown in FIGURE 7 is substantially horizontal as indicated by dashed line 28, but has inclined planes 29 between the recesses 27, thereby realizing the condition to have at least at one place mirrors disposed at a right angle λ to each other the reflecting part 29 constituting the bottom being not horizontal but inclined toward the horizontal bottom plane at 28.

A further embodiment shown in FIGURES 8 to 10 is also based upon the utilization of reflecting surfaces made of right angled dihedrons which are disposed stepwise with inclined faces in the bottom of the lens 30 in the manner shown in a plan view in FIGURE 8 and in cross-section in FIGURE 9.

As has been mentioned in connection with the description of the embodiments according to FIGURES 2 to 4, it is advantageous not to maintain the reflecting mirror faces in a strictly parallel relation to each other over the entire length, thereof, but to curve these faces inwardly in order to ensure a good reflection from the point of view of the driver of the vehicle, even if the latter would not travel in a direction strictly perpendicular to the transverse direction of the mirrors.

In the present embodiment, the mirror faces in question extend substantially in a direction parallel to the diameter a—b, but they are of zig zag shape instead of being rectilinear. This appears clearly at 31 in FIGURES 8 and 9 and in the cross section of the central part of the bottom of the lens shown on an enlarged scale in FIGURE 10.

This has the advantage to reflect that incident rays coming from the left or from the right in FIGURE 8 are reflected by dispersing them laterally in such a manner that not only certain rays are sent back to the driver but that the lens is so lit up as to attain a great luminosity. It thus lights up in the middle of the road each time a vehicle with lighted head-lights approaches.

In FIGURE 9, there is shown, on a reduced scale, a lens body as dimensioned proportionately in Example III supra. In order to reduce the amount of light reflected first by the secondary instead of the primary reflector surfaces to a minimum, the inclination of the reflector surfaces to the bottom is staggered to have a minimum inclination (of 8°) at the center and a maximum inclination (24°) along the marginal portions of the lens body.

It is evident that the shape and arrangement of the reflecting surfaces provided in the bottom of the lens can offer very different characteristics and that it is possible to provide very complicated geometrical designs with the aim of obtaining a lighting of the lens as perfect as possible due to the action of pencils of light skimming the ground toward the marker.

As an example of such a complicated design another embodiment is shown in a plan view in FIGURE 11 and in cross-section in FIGURE 12.

The manner in which the bottom of this lens is shaped is shown in detail in FIGURE 13 as seen from below and in FIGURE 14 as in cross section along line 14—14 of FIGURE 13.

A set of reflecting surfaces including 90° angles in order to satisfy the condition stated at the beginning of the present description is provided in the bottom of lens body 30. The reflecting surfaces including said right angles are further disposed in such manner that there are alternative sets of mirrors such as 32 destined to respond to light coming from the right in the drawing, and sets 33 destined to respond, on the contrary, to light coming from the left with regard to the drawing.

FIGURES 15 and 16 show how the lens body according to the present invention can be assembled as a road marker and embedded in the ground, for instance in blocks made of cement or concrete, preferably in the form of prefabricated elements.

In this case, the lens 34 of which the bottom is shown as flat in order to simplify the drawing, but which is devised in accordance with any one of the aforesaid embodiments, is placed in a ring 35 made of cast iron, which is filled by the lens fills with a clearance in such a way that only the upper curved part or calotte emerges from the ring 35.

The lens rests in the said ring upon an intermediary resilient band 36 which fixes its position laterally as well as in depth. The annular space 37 remaining above the said band between the cylindrical wall of the lens and the cylindrical (or preferably slightly conical) internal face of the ring is filled with a material which is also resilient and able to resist the penetration of water, for example, this filling may be of a bituminous or like material.

Laterally the ring 35 has a horizontally protruding flange 38 and vertical radial ribs 39 destined to ensure its proper positioning in the ground 40 or more particularly in a concrete slab.

FIGURES 17 and 18 show a similiar arrangement but comprising a lens 41 of which the upper face is not spherical but elliptical as delimited by margin 41a, and the corresponding ring 42 which has an internal recess adapted to the elliptic form of the lens.

Ring 42 has also vertical radial ribs 43 and reposes on the flange 44, but the latter is not planar in the present case, but follows the curved shape of the lens in order to facilitate climbing of vehicle wheels onto and passing over the lens at those places where it has not itself the necessary declivity.

FIGURE 19 illustrates a mounting socket of plastic material which comprises a flat body 50 having a cavity 51 adapted for receiving therein a snugly fitting lens body 52. This lens body 52 is inserted obliquely into the cavity by slightly bending ajar the resilient upper marginal flange portion 53 and then causing peripherally disposed noses 54 of the lens body 52 to enter corresponding recesses 55 in the inner peripheral wall of cavity 51. External supporting ribs 56 impart great stability to the flange 53.

The lens markers according to the present invention resolve all the problems of road signalling and can be embedded in the ground so as to constitute lines, arrows, or any designs, for instance to write the word "stop," or to denote pedestrians' crossing. They can also be disposed laterally, on walls or the edges of footpaths on condition that they are lighted always under a skimming angle.

They can also be used for the delimitation of parking places.

The lenses embedded in their ring or sleeve can be disposed in blocks of concrete which it is possible to prefabricate in straight or curved pieces or of any desired shape bearing a certain number of lenses or receptacles, for instance of plastic material, intended for receiving the lenses.

It is evidently also possible to complement this arrangement by a combination of colors, for example to use white or yellow concrete with lenses which are, at will, colored or not.

Instead of prefabricating the pieces of concrete with the lenses included therein it is also possible to mold on the ground slabs of concrete having cells adapted to receive the lenses therein together with their cast-iron or plastic sleeve elements, or with the sleeves already incorporated in the concrete.

The glass used for these lenses must naturally be of a quality which can support the loads and stress due to the traffic of vehicles over the road. Hardened or annealed glass, for example, is recommended and the reflecting surfaces or mirrors can be obtained by applying a metal coating of the respective parts, for example by silvering.

It is also possible to make the lens self-lighting by utilizing for the coating of the mirror elements new varnishes which can be excited and made luminous by an electric current.

Obviously, the invention is not restricted to the particular modifications thereof herein shown and described, but is capable of various changes within the scope of the appended claims.

What I claim is:

1. A light reflecting road marker capable of reflecting the beam from an automobile headlamp so that the angle between the reflected beam and the road is greater than the angle between the impinging beam and the road, thereby permitting the reflected beam to be directed to the eyes of the driver of the automobile so that the driver is aware of the road marker at a great distance therefrom, said road marker comprising a lens-shaped block of glass having a convex upper surface and destined to be embedded in the ground with the exception of its upper face, the intersection of said upper face and road surface being the mounting plane, said mounting plane being parallel to the road surface, and substantially parallel to the convex upper surface, said glass block further having a bottom provided with reflecting faces disposed in at least one series of right angled mirrored dihedrons of which both sides are inclined with regard to the plane delimiting said bottom, said plane being parallel to and below the mounting plane, the whole being so disposed that an incident pencil of light coming from an approaching light source and entering the convex part of the glass block in a direction forming an angle α between 0.2° and 7° with the level of the ground is refracted in said block toward said mirrored dihedrons, each of said dihedrons having one larger and one smaller surface at right angle to each other, the smaller surfaces of all dihedrons of said series being opposed at an almost right angle to the direction of the refracted light pencil resulting from said incident pencil, while the larger surfaces of all dihedrons of said series are disposed at an angle β to said bottom-delimiting plane which angle β is almost as large as the angle formed between said refracted light pencil and said bottom-delimiting plane; whereby the major portion of said light pencil is then twice reflected by at least one of said reflecting dihedrons so as to be returned parallel to the direction of refraction, whereupon said major portion of the light pencil leaves the said convex part of the glass block to a point on said convex surface nearer said light source than the point of entry, whereupon it is returned toward said approaching light source at an angle slightly larger than said angle α.

2. A device as described in claim 1, in which the right angled mirrored dihedrons extend parallelly together in the direction of a diameter of said glass block and are symmetrically arranged at both sides of said diameter.

3. A device as described in claim 1, in which the right angled mirrored dihedrons extend parallelly together in two zones in the direction of a diameter of said glass block and are symmetrically arranged at both sides of said diameter, and wherein a zone of cup-shaped mirrors is provided in a zone intermediate said dihedron zones.

4. A device as described in claim 1, in which the right angled mirrored dihedrons extend parallelly together in the direction of a diameter of said glass block and are symmetrically arranged at both sides of said diameter, the parallel disposed reflecting faces of said dihedrons being curved inwardly toward said diameter near their ends.

5. A device as described in claim 1, in which the right angled mirrored dihedrons extend parallel with each other in the direction of a diameter of said glass block and are symmetrically arranged at both sides of said diameter, the parallelly disposed reflecting faces of said dihedrons being wave-shaped in horizontal projection.

6. A device as in claim 1, in which the right angled mirrored dihedrons extend parallel with each other in the direction of a diameter of said glass block and are symmetrically arranged at both sides of said diameter, the parallel disposed reflecting faces of said dihedrons being zigzag-shaped in horizontal projection.

7. A device as in claim 1, wherein said larger dihedron surfaces are constituted by flat elements being part of the bottom of the lens, said smaller dihedron surfaces being constituted by the walls of cup-shaped recesses in the lens bottom, the whole being so arranged that flat elements and cup-shaped elements have parts which are at right angle with each other.

8. A device as in claim 1, wherein said dihedrons have reflecting elements which are constituted by symmetrical elements alternatively disposed the one beside the other and having each a set of mirror faces at right angle with each other.

9. A device as in claim 1, wherein said dihedrons are constituted by reflecting recesses in the lens body in form of hollows in the glass mass opening toward said bottom.

10. A light reflecting road marker capable of reflecting the beam from an automobile headlamp so that the angle between the reflected beam and the road is greater than the angle between the impinging beam and the road, thereby permitting the reflected beam to be directed to the eyes of the driver of the automobile so that the driver is aware of the road marker at a great distance therefrom, said road marker comprising a lens-shaped block of glass having a convex upper surface and destined to be embedded in the ground with the exception of its upper face, the intersection of said upper face and road surface being the mounting plane, said mounting plane being parallel to the road surface, and substantially parallel to the convex upper surface, said glass block further having a bottom being delimited by a plane below and parallel to said mounting plane, said bottom being provided with reflecting faces disposed in two groups of right angled mirrored dihedrons having sides inclined to the bottom delimiting plane, which groups are disposed to one side of a diametrical zone of said bottom and adapted for receiving light refracted from that portion of said top surface above the opposite group on the other side of said diametrical zone, each of said groups being so disposed that incident light received by said top portion on one side of said diametrical zone and under angles between 0.2° and 7° relative to the ground is refracted toward the group of dihedrons on the other side of said diametrical zone, each of said dihedrons having one larger and one smaller surface at right angle to each other, the smaller surfaces of all dihedrons of each group being opposed at an almost right angle to the direction of the refracted light resulting from said incident light, while the larger surfaces of all dihedrons of each group are disposed at an angle to said bottom which angle is almost as large as the angle formed between said refracted light and said bottom; whereby the smaller surfaces of the dihedrons of the group on said other side of said diametrical zone oppose said refracted light under such an angle as to reflect the same toward said larger surfaces, so that the major portion of said refracted light is reflected back toward said top portion and refracted at the surface of the latter to leave said lens body in the direction of the incoming light at a greater angle with said ground than the latter light.

References Cited in the file of this patent

UNITED STATES PATENTS

| | | |
|---|---|---|
| 355,810 | Brown | Jan. 11, 1887 |
| 1,895,173 | Sandford | Jan. 24, 1933 |
| 1,956,252 | Robertson | Apr. 24, 1934 |
| 2,229,179 | Langdon | Jan. 21, 1941 |
| 2,310,817 | Taylor | Feb. 9, 1943 |
| 2,328,407 | Becker | Aug. 31, 1943 |

FOREIGN PATENTS

| | | |
|---|---|---|
| 360,761 | Great Britain | Nov. 12, 1931 |
| 438,328 | Great Britain | Nov. 14, 1935 |
| 873,224 | Germany | Apr. 13, 1953 |